US009741468B2

(12) United States Patent
León-Guarena et al.

(10) Patent No.: US 9,741,468 B2
(45) Date of Patent: Aug. 22, 2017

(54) POWER CABLE FILLER DEVICE AND POWER CABLE COMPRISING THE SAME

(71) Applicant: ABB HV Cables (Switzerland) GmbH, Baden (CH)

(72) Inventors: Armando León-Guarena, Karlskrona (SE); Andreas Tyrberg, Lyckeby (SE); Lisa Johansson, Ronneby (SE)

(73) Assignee: ABB HV Cables (Switzerland) GmbH, Baden (CH)

( * ) Notice: Subject to any disclaimer, the term of this patent is extended or adjusted under 35 U.S.C. 154(b) by 0 days.

(21) Appl. No.: 15/039,843

(22) PCT Filed: Apr. 9, 2014

(86) PCT No.: PCT/EP2014/057109
§ 371 (c)(1),
(2) Date: May 26, 2016

(87) PCT Pub. No.: WO2015/110182
PCT Pub. Date: Jul. 30, 2015

(65) Prior Publication Data
US 2016/0379737 A1  Dec. 29, 2016

(30) Foreign Application Priority Data

Jan. 21, 2014  (WO) ................. PCT/EP2014/051145

(51) Int. Cl.
*H01B 9/00* (2006.01)
*H01B 7/18* (2006.01)
(Continued)

(52) U.S. Cl.
CPC ........... *H01B 9/005* (2013.01); *G02B 6/4417* (2013.01); *G02B 6/4427* (2013.01); *G02B 6/506* (2013.01);
(Continued)

(58) Field of Classification Search
None
See application file for complete search history.

(56) References Cited

U.S. PATENT DOCUMENTS 4,384,944 A * 5/1983 Silver .................... H01B 3/004
174/120 SC
8,314,330 B2 * 11/2012 Graff ....................... F16L 11/22
174/47
(Continued)

FOREIGN PATENT DOCUMENTS

CN  201229428 Y  4/2009
CN  201765875 U  3/2011
(Continued)

OTHER PUBLICATIONS

International Preliminary Report on Patentability Application No. PCT/EP2014/057109 Issued: Dec. 22, 2015 6 pages.
(Continued)

*Primary Examiner* — Dimary Lopez Cruz
(74) *Attorney, Agent, or Firm* — Whitmyer Group LLC

(57) ABSTRACT

A power cable and filler device adapted to bear against a first and second power cores in a power cable, including a first arced wall which defines a portion of a first circle having a first diameter, a second and third arced wall, each defining a portion of a second circle having a second diameter which is smaller than the first diameter. A chamber is formed between the first, second and third arced walls.

20 Claims, 4 Drawing Sheets

(51) Int. Cl.
*H02G 9/02* (2006.01)
*G02B 6/44* (2006.01)
*G02B 6/50* (2006.01)
*H02G 9/04* (2006.01)

(52) U.S. Cl.
CPC ............. *H01B 7/1895* (2013.01); *H02G 9/02* (2013.01); *G02B 6/4459* (2013.01); *H02G 9/04* (2013.01)

(56) References Cited

U.S. PATENT DOCUMENTS

| | | |
|---|---|---|
| 2010/0122844 A1 | 5/2010 | Efraimsson et al. |
| 2012/0205137 A1 | 8/2012 | Fjellner et al. |

FOREIGN PATENT DOCUMENTS

| | | | |
|---|---|---|---|
| EP | 1217409 | A2 | 6/2002 |
| JP | H09184948 | A | 7/1997 |
| JP | 2005141157 | A | 6/2005 |
| JP | 2007073519 | A  * | 3/2007 |
| SE | 530277 | C2 | 4/2008 |
| WO | 2004006272 | A1 | 1/2004 |

OTHER PUBLICATIONS

International Search Report and Written Opinion of the International Searching Authority Application No. PCT/EP2014/057109 completed: Sep. 11, 2014; Mailing Date: Sep. 22, 2014 8 pages.
Japanese Office Action Application No. 2016-564384 Completed: Feb. 24, 2017; dated Feb. 28, 2017 4 pages.

* cited by examiner

POWER CABLE FILLER DEVICE AND POWER CABLE COMPRISING THE SAME

TECHNICAL FIELD

The present disclosure generally relates to power cables. In particular it relates to a power cable filler device adapted to bear against a first power core and a second power core in a power cable, and to a power cable comprising such a power cable filler device.

BACKGROUND

For three core high voltage cables, plastic fillers are traditionally introduced in between the cores during assembly. The fillers are designed to fit properly between the cores and to achieve an overall circular shape of the entire cable cross section. Normally, fillers are designed primarily to keep the power cable's roundness and for holding optical fibres.

An example of a filler is disclosed in SE 530 277 C2. This document discloses a power cable including three cores that are twinned with each other and arranged within a common external sheath. The power cable also comprises filler elements, each filler element being arranged in a respective space between the two cores and the external sheath. The filler elements have a profiled hollow body.

A power cable that is to be installed on the seabed is laid by special vessels that transport the power cable. The power cable may be wound on a large drum on the vessel during transport. During installation the power cable is wound off the drum, and the power cable may be fed onto a tower from which it is lowered into the sea. In order to be able to control the rate at which the power cable is lowered into the sea, tensioners on the tower are arranged to provide a suitable radial pressure to the power cable. The radial pressure applied to the power cable may be considerable, in order to hold the weight of a power cable extending down to the sea floor.

In case the power cable of SE 530 277 C2 would be installed in ultra deep-water, i.e. at depths starting at 1500 m, the filler walls may collapse during installation due to the large radial forces from tensioners. As a consequence, the optical fibre can be damaged and large local deformation may also occur on the cores due to excessive local contact forces with the filler ends. Irregular deformations on a core's insulation could affect the electrical field distribution around its cross section.

SUMMARY

In view of the above, an object of the present disclosure is to provide a power cable filler device which is capable to withstand the large radial forces from tensioners associated with ultra deep-water installation.

Hence, according to a first aspect of the present disclosure there is provided a power cable filler device adapted to bear against a first power core and a second power core in a power cable, wherein the power cable filler device comprises: a first arced wall which defines a portion of a first circle having a first diameter, a second arced wall and a third arced wall, each defining a portion of a second circle having a second diameter which is smaller than the first diameter, which first arced wall has a first end connected to a first end of the second arced wall, and which first arced wall has a second end connected to a first end of the third arced wall, wherein the second arced wall has a second end and the third arced wall has a second end adjacent each other and defining a slit, whereby a chamber is formed between the first arced wall, the second arced wall and the third arced wall, a first partitioning wall in the chamber, extending between the first arced wall and the second arced wall, and a second partitioning wall in the chamber, extending between the first arced wall and the third arced wall, wherein the first partitioning wall extends in a first radial direction along its entire extension from the first arced wall to the second arced wall, and wherein the second partitioning wall extends in a second radial direction along its entire extension from the first arced wall to the third arced wall, which first radial direction and second radial direction are defined with respect to the radius of the first arced wall.

By providing a first partitioning wall and a second partitioning wall that extend in radial directions in the chamber, the power cable filler device, especially the partitioning walls, is able to withstand radial forces involved in lowering a power cable comprising the power cable filler device to water depths that have not been previously been possible.

According to one embodiment the first partitioning wall and the second partitioning wall are arranged at equal distance from the slit. Equal force distribution between the first partitioning wall and the second partitioning wall may thereby be obtained.

According to one embodiment the distance from the tip of the first end of the first arced wall to a point on the second circle defined by the second arced wall where the first circle tangents the second circle defined by the second arced wall is less than 0.6 times the radius of the second arced wall. By providing a first arced wall that has lateral extension of this magnitude, the local deformation between the power cable filler device ends and the power cores of a power cable may thereby be reduced because the force becomes more evenly distributed in this area.

According to one embodiment the distance from the tip of the second end of the first arced wall to a point on the second circle defined by the third arced wall where the first circle tangents the second circle defined by the third arced wall is less than 0.6 times the radius of the second arced wall.

One embodiment comprises a third partitioning wall in the chamber, which third partitioning wall extends between the first arced wall and the second arced wall.

According to one embodiment the third partitioning wall extends in a third radial direction along its entire extension from the first arced wall to the second arced wall, the third radial direction being defined with respect to the radius of the first arced wall.

One embodiment comprises a fourth partitioning wall in the chamber, which fourth partitioning wall extends between the first arced wall and the third arced wall.

By providing additional partitioning walls, the mechanical withstand strength of the power cable filler device may be further increased, especially concerning radial forces.

According to one embodiment the fourth partitioning wall extends in a fourth radial direction along its entire extension from the first arced wall to the third arced wall, the fourth radial direction being defined with respect to the radius of the first arced wall.

According to one embodiment the third partitioning wall and the fourth partitioning wall are arranged at an equal distance from the slit, and wherein the first partitioning wall, the second partitioning wall, the third partitioning wall and the fourth partitioning wall are evenly distributed in the chamber.

According to one embodiment the second end of the second arced wall bears against the second end of the third arced wall. By having a very narrow slit, the power cable filler device is able to extend further between two adjacent power cores. Thereby the second arced wall and the third arced wall will have larger surface areas, able to take and distribute forces between two adjacent power cores such that local deformation between cable cores may be reduced.

According to one embodiment the power cable filler device has a constant cross-sectional geometry along its entire length.

One embodiment comprises medium density polyethylene.

According to a second aspect of the present disclosure there is provided a power cable comprising: an external sheath, a first power core, a second power core, and a third power core, arranged within the external sheath, and three power cable filler devices according to the first aspect presented herein, wherein a first power cable filler device is arranged between the external sheath, the first power core and the second power core, a second power cable filler device is arranged between the external sheath, the second power core and the third power core, and a third power cable filler device is arranged between the external sheath, the first power core and the third power core.

According to one embodiment the power cable is a subsea power cable.

According to one embodiment the power cable is a high voltage power cable.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which:

FIG. 2b shows a detailed view of a lateral portion of the power cable filler device in FIG. 2a;

FIG. 2c shows a detailed view of the adjacent second ends of the first arced wall and the second arced wall of the power cable filler device in FIG. 2a.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
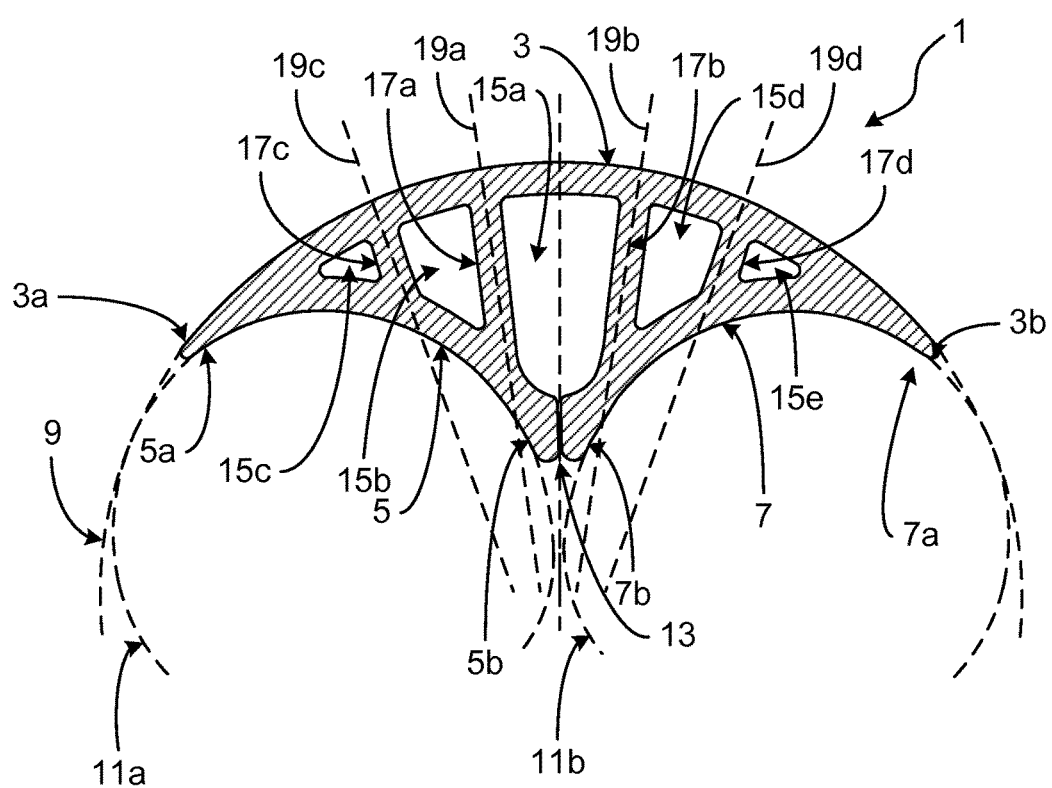
FIGS. 1 and 2a depict a cross-section of an example of a power cable filler device.

FIG. 1 shows a cross sectional view of an example of a power cable filler device 1. In a typical variation, the cross-sectional geometry of the power cable filler device 1 is constant along its entire longitudinal extension. The power cable filler device 1 is adapted to be arranged within a power cable having three twinned power cores, in the space formed between two power cores and the external sheath of the power cable.

The power cable filler device 1 comprises a first arced wall 3, a second arced wall 5 and a third arced wall 7. The first arced wall 3, the second arced wall 5 and the third arced wall 7 define the external surfaces of the power cable filler device 1.

The first arced wall 3 defines a portion of a first circle 9 having a first diameter. The second arced wall 5 and the third arced wall 7 each define a portion of a respective second circle 11a, 11b. Each of these second circles 11a, 11b has a second diameter which is smaller than the first diameter. It may be mentioned that these circles are all purely imaginary and only discussed in order to be able to define the curvature sizes and shapes of the arced walls 3, 5 and 7.

The first arced wall 3 has a first end 3a defining a lateral end of the first arced wall 3. The first arced wall 3 has a second end 3b defining the opposite lateral end of the first arced wall 3. The second arced wall 5 has a first end 5a and a second end 5b. The third arced wall 7 has a first end 7a and a second end 7b.

The first end 3a of the first arced wall 3 is connected to the first end 5a of the second arced wall 5. The second end 3b of the first arced wall 3 is connected to the first end 7a of the third arced wall 7. The second end 5b of the second arced wall 5 is arranged adjacent to the second end 7b of the third arced wall 7. The second end 5b of the second arced wall 5 and the second end 7b of the third arced wall 7 define a slit 13. The first arced wall 3, the second arced wall 5 and the third arced wall 7 thereby define the outer walls of a chamber, which chamber is subdivided into a plurality of smaller chambers 15a-15e by means of partitioning walls which will be described below. A central chamber 15a is open because the slit 13 forms a channel which connects the central chamber 15a with the exterior of the power cable filler device 1.

The power cable filler device 1 may be flexible to enable widening of the slit 13 for fitting an optical fibre cable within the central chamber 15a. The power cable filler device 1 may therefore for example comprise medium density polyethylene or any other suitable flexible material which also has high mechanical strength.

According to one example, the second end 5b of the second arced wall 5 bears against the second end 7b of the third arced wall 7. Alternatively, the second ends of the second arced wall and the third arced wall may be are arranged adjacent to each other but spaced apart, for example by a distance in the range 0.5-3 mm, or the distance may be larger than that.

The power cable filler device 1 further comprises a first partitioning wall 17a extending between the first arced wall 3 and the second arced wall 5, and a second partitioning wall 17b extending between the first arced wall 3 and the third arced wall 7.

The first partitioning wall 17a extends in a first radial direction 19a along its entire extension between the first arced wall 3 and the second arced wall 5. The first partitioning wall 17a is hence straight. The second partitioning wall 17b extends in a second radial direction 19b along its entire extension between the first arced wall 3 and the third arced wall 7. The second partitioning wall 17b is hence straight.

The first radial direction 19a and the second radial direction 19b are defined with respect to the radius of the first arced wall 3. The first partitioning wall 17a and the second partitioning wall 17b are hence extending towards the centre of the first circle 9. In particular, the first partitioning wall 17a and the second partitioning wall 17b each defines a plane that intersects the centre of the first circle 9.

The first partitioning wall 17a and the second partitioning wall 17b are preferably arranged at an equal distance from the slit 13, at a respective side thereof.

According to the example shown in FIG. 1, the power cable filler device 1 comprises a third partitioning wall 17c and a fourth partitioning wall 17d. The third partitioning wall 17c extends between the first arced wall 3 and the second arced wall 5, and the fourth partitioning wall 17d extends between the first arced wall 3 and the third arced wall 7.

The third partitioning wall 17c extends in a third radial direction 19c along its entire extension between the first arced wall 3 and the second arced wall 5. The third partitioning wall 17c is hence straight. The fourth partitioning wall 17d extends in a fourth radial direction 19d along its entire extension between the first arced wall 3 and the third arced wall 7. The fourth partitioning wall 17d is hence straight.

The third radial direction 19c and the fourth radial direction 19d are defined with respect to the radius of the first arced wall 3. The third partitioning wall 17c and the fourth partitioning wall 17d are hence extending towards the centre of the first circle 9. In particular, the third partitioning wall 17c and the fourth partitioning wall 17d each defines a plane that intersects the centre of the first circle 9.

It should be noted that variations of the power cable filler device 1 may comprise fewer than four partitioning walls, i.e. two partitioning walls, namely the first partitioning wall and the second partitioning wall, or more than four partitioning walls. Preferably, the distribution of partitioning walls is even with respect to the slit so that there is an equal amount of partitioning walls at each side of the slit.

Figure 2A:
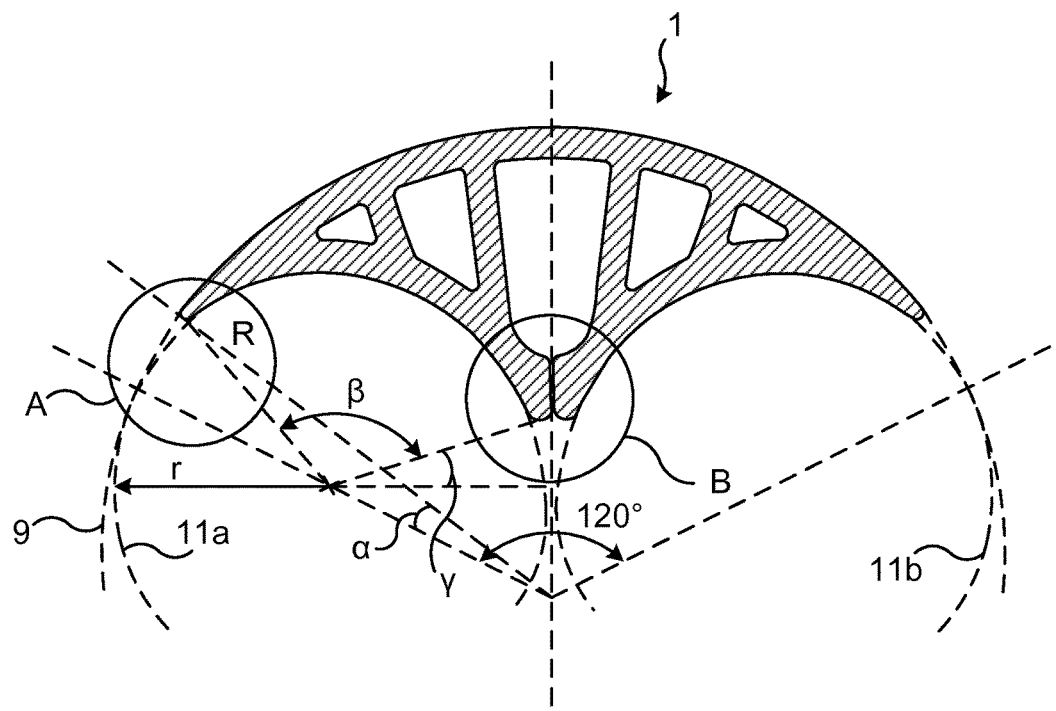
Figure 2B:
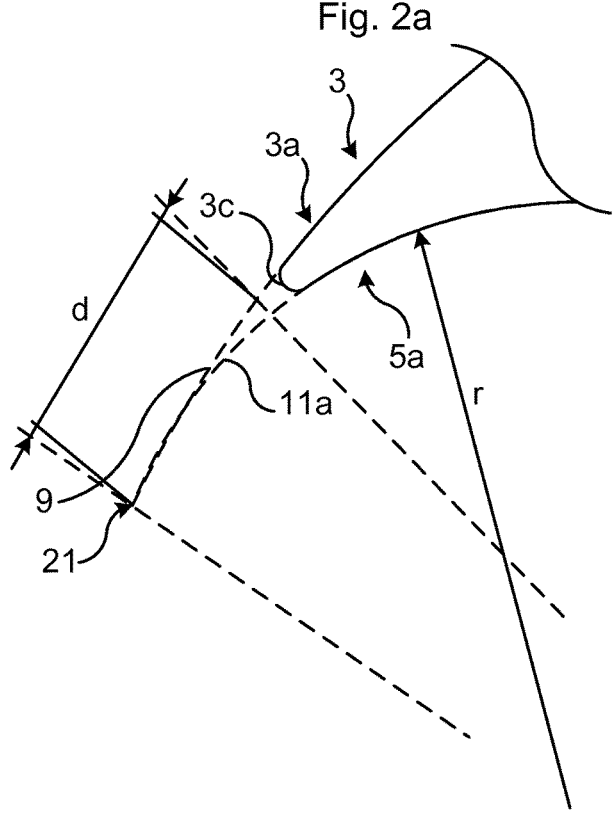

FIG. 2b depicts a detail A of the power cable filler device 1 shown in FIG. 2a. In particular, the first end 3a of the first arced wall 3 is shown. The second end 3b is identical in structure to the first end 3a, and will therefore not be described herein. The amount of lateral extension of the first end 3a and the second end 3b of the first arced wall 3 will be characterised with reference to FIGS. 2a-b. The first end 3a and the second end 3b each has a tip, as shown by tip 3c of the first end 3a. There is a point 21 where the first circle 9 and the second circle 11 defined by the second arced wall 5 are parallel, i.e. a point where the first circle 9 tangents the second circle 11a defined by the second arced wall 5. A distance d from the tip 3c to the point 21 is less than 0.6 times the radius r of the second circle 11, preferable less than 0.57 times the radius r of the second circle 11a, i.e. the radius of the second arced wall 5. In other words, the arc angle α with respect to the first circle 9 between the tip 3c and the point 21 should be less than 15°. The arc angle should be as small as possible, ideally 0°, but from a production perspective it would currently not be realistic to produce such a sharp tip along the entire longitudinal extension of the power cable filler device 1. As noted above, the same applies analogously also to the second end 3b. This means that the lateral sides, i.e. the first end 3a and the second end 3b extend further than in the prior art, and bear against larger portions of a respective power core. Thereby, local deformation between the first end 3a and the power core of a power cable, and local deformation between the second end 3b and the power core of a power cable may be reduced.

An alternative manner to characterise the lateral extension of the first end 3a and the second end 3b is that the extension of the first arced wall 3 from the tip of the first end 3a to the tip of the second end 3b should be at least 75% of an arc length of the first circle 9 with an arc angle of 120°. In other words, the first arced wall 3 has an extension between its tips which at least corresponds to an angle therebetween which is 90° with respect to the first circle 9. Hence, the angle between a first line which intersects the centre of the first circle 9 and which tangents the tip of the first end 3a and a second line which intersects the centre of the first circle 9 and which tangents the tip of the second end 3b, is at least 90°.

Figure 2C:
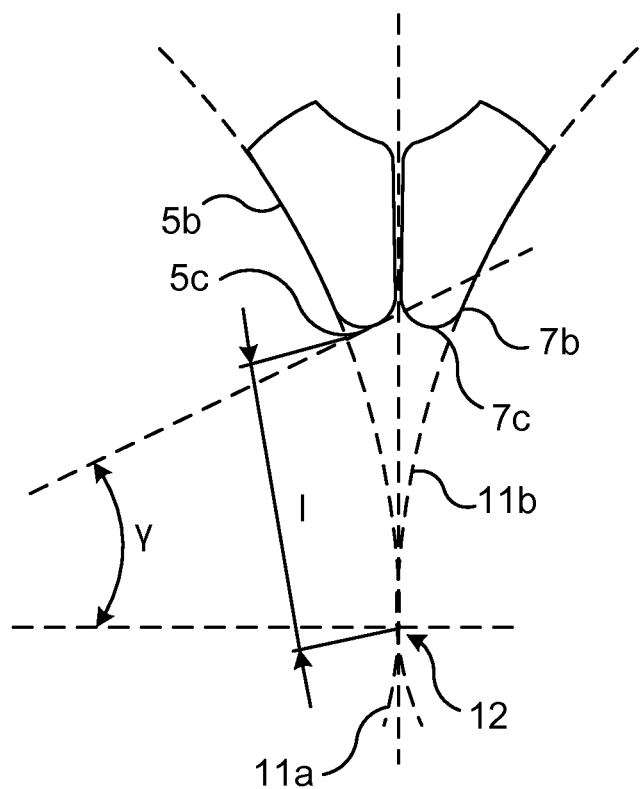

FIG. 2c shows a detail B of the power cable filler device 1 shown in FIG. 2a. The detail B includes the second end 5b of the second arced wall 5 adjacent the second end 7b of the third arced wall 7. Each of the second ends 5b, 7b has a respective tip 5c and 7c. A distance l from each tip 5c, 7c to a point 12 where the second circle 11a defined by the second arced wall 5 and the second circle 11b defined by the third arced wall 7 meet and tangent each other is preferable less than 0.6 times the radius r of either of the two second circles 11a, 11b. Preferably, the distance l is less than 0.57 times the radius r. The latter implies that with respect to a second circle 11a, 11b, the angle γ between a tip 5c, 7c of an arced wall 5, 7 associated with that second circle 11a, 11b and the point 12 is less than 30°. Furthermore, an angle β between for example the tip 3c of the first arced wall 3 and the tip 5c of the second end 5b of the second arced wall 5, as defined in the second circle 11a, should be greater than 90°. This of course also applies to the corresponding angle between the other tip of the first arced wall 3 and the tip 7c of the second end 7b of the third arced wall 7. Ideally, of course, the second ends 5b and 7b would extend the entire way to the point 12, wherein the tips 5c and 7c would be located at the point 12, but from a production perspective it would not be realistic to manufacture such second ends 5b and 7b along the entire power cable filler device 1.

Figure 3:
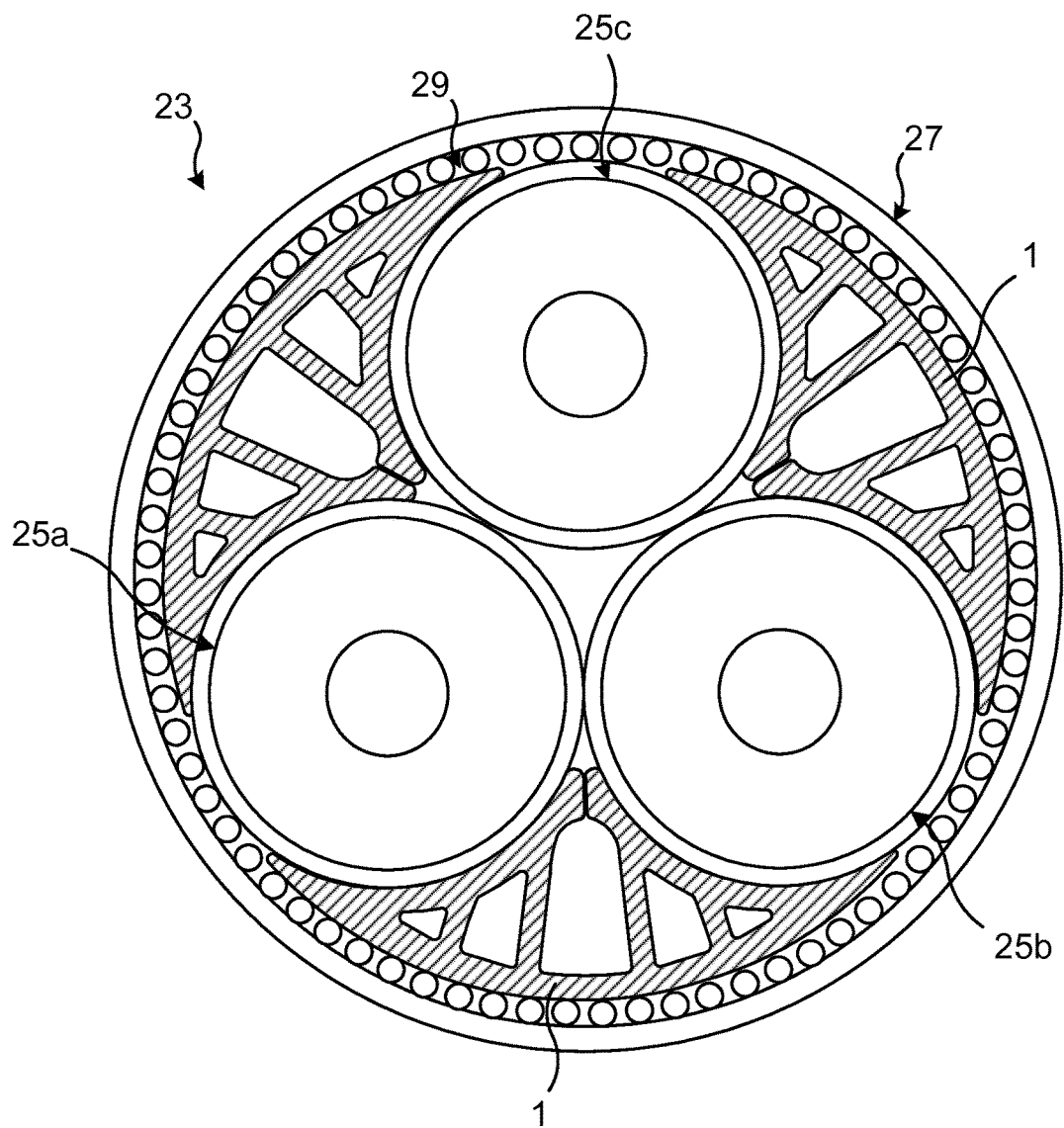
FIG. 3 depicts a cross-section of a power cable comprising several power cable filler devices of the type shown in FIG. 1.

FIG. 3 shows a cross-section of an example of a power cable 23 comprising a number of power cores 25a, 25b, 25c. The power cable 23 comprises an external sheath 27, an armour layer 29, power cable filler devices 1, and a first power core 25a, a second power core 25b and a third power core 25c. Each power cable filler device 1 is arranged between two power cores 25a-25c, and the external sheath 27. It should be noted that according to variations of the power cable 23, there could be additional armour layers 29, or the power cable could be without armour layers.

The power cores 25a-25c are twinned along the length of the power cable 23. The power cable filler devices 1 are twisted as they extend longitudinally, due to the twinning of the power cores 25a-25c. The external sheath 27 and the armour layer 29 enclose the power cores 25a-25c and the power cable filler devices 1.

The power cable 23 may for example be a subsea power cable, in particular a high voltage subsea power cable. It is envisaged that power cable filler device and the power cable presented herein may be utilised in subsea applications such as subsea power transmission or subsea power distribution. The power cable and power cable filler device are especially suitable for use in ultra deep-water, although they could of course also be used at smaller depths.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A power cable filler device adapted to bear against a first power core and a second power core in a power cable, wherein the power cable filler device comprises:
   a first arced wall which defines a portion of a first circle having a first diameter,
   a second arced wall and a third arced wall, each defining a portion of a second circle having a second diameter which is smaller than the first diameter, the first arced wall has a first end connected to a first end of the second arced wall, and the first arced wall has a second end connected to a first end of the third arced wall, wherein the second arced wall has a second end and the third arced wall has a second end adjacent each other and defining a slit, whereby a chamber is formed between the first arced wall, the second arced wall and the third arced wall,
   a first partitioning wall in the chamber, extending between the first arced wall and the second arced wall, and
   a second partitioning wall in the chamber, extending between the first arced wall and the third arced wall,
   wherein the first partitioning wall extends in a first radial direction along its entire extension from the first arced wall to the second arced wall, and wherein the second partitioning wall extends in a second radial direction along its entire extension from the first arced wall to the third arced wall, the first radial direction and the second radial direction being defined with respect to a radius of the first arced wall.

2. The power cable filler device as claimed in claim 1, wherein the first partitioning wall and the second partitioning wall are arranged at equal distance from the slit.

3. The power cable filler device as claimed in claim 1, wherein a distance from a tip of the first end of the first arced wall to a point on the second circle defined by the second arced wall where the first circle tangents the second circle defined by the second arced wall is less than 0.6 times a radius of the second arced wall.

4. The power cable filler device as claimed in claim 1, wherein a distance from a tip of the second end of the first arced wall to a point on the second circle defined by the third arced wall where the first circle tangents the second circle defined by the third arced wall is less than 0.6 times a radius of the third arced wall.

5. The power cable filler device as claimed in claim 1, comprising a third partitioning wall in the chamber, the third partitioning wall extends between the first arced wall and the second arced wall.

6. The power cable filler device as claimed in claim 5, wherein the third partitioning wall extends in a third radial direction along its entire extension from the first arced wall to the second arced wall, the third radial direction being defined with respect to the radius of the first arced wall.

7. The power cable filler device as claimed in claim 5, comprising a fourth partitioning wall in the chamber, the fourth partitioning wall extends between the first arced wall and the third arced wall.

8. The power cable filler device as claimed in claim 7, wherein the fourth partitioning wall extends in a fourth radial direction along its entire extension from the first arced wall to the third arced wall, the fourth radial direction being defined with respect to the radius of the first arced wall.

9. The power cable filler device as claimed in claim 7, wherein the third partitioning wall and the fourth partitioning wall are arranged at an equal distance from the slit, and wherein the first partitioning wall, the second partitioning wall, the third partitioning wall and the fourth partitioning wall are evenly distributed in the chamber.

10. The power cable filler device as claimed in claim 1, wherein the second end of the second arced wall bears against the second end of the third arced wall.

11. The power cable filler device as claimed in claim 1, wherein the power cable filler device has a constant cross-sectional geometry along its entire length.

12. The power cable filler device as claimed in claim 1, comprising medium density polyethylene.

13. A power cable comprising:
   an external sheath,
   a first power core, a second power core, and a third power core, arranged within the external sheath, and
   three power cable filler devices each including:
      a first arced wall which defines a portion of a first circle having a first diameter,
      a second arced wall and a third arced wall, each defining a portion of a second circle having a second diameter which is smaller than the first diameter, the first arced wall has a first end connected to a first end of the second arced wall, and the first arced wall has a second end connected to a first end of the third arced wall, wherein the second arced wall has a second end and the third arced wall has a second end adjacent each other and defining a slit, whereby a chamber is formed between the first arced wall, the second arced wall and the third arced wall,
      a first partitioning wall in the chamber, extending between the first arced wall and the second arced wall, and
      a second partitioning wall in the chamber, extending between the first arced wall and the third arced wall,
      wherein the first partitioning wall extends in a first radial direction along its entire extension from the first arced wall to the second arced wall, and wherein the second partitioning wall extends in a second radial direction along its entire extension from the first arced wall to the third arced wall, the first radial direction and the second radial direction are defined with respect to the radius of the first arced wall,
   wherein the three power cable filler devices comprise a first power cable filler device, a second power cable filler device and a third power cable filler device, the first power cable filler device being arranged between the external sheath, the first power core and the second power core, the second power cable filler device being arranged between the external sheath, the second power core and the third power core, and the third power cable filler device being arranged between the external sheath, the first power core and the third power core.

14. The power cable as claimed in claim 13, wherein the power cable is a subsea power cable.

15. The power cable as claimed in claim 13, wherein the power cable is a high voltage power cable.

16. The power cable as claimed in claim 13, wherein the first partitioning wall and the second partitioning wall are arranged at equal distance from the slit.

17. The power cable as claimed in claim 13, wherein each of the three power cable filler devices comprises a third partitioning wall in the chamber, the third partitioning wall extends between the first arced wall and the second arced wall.

18. The power cable as claimed in claim 17, wherein each of the three power cable filler devices comprises a fourth partitioning wall in the chamber, the fourth partitioning wall extends between the first arced wall and the third arced wall.

19. The power cable as claimed in claim 18, wherein for each of the three power cable filler devices, the third partitioning wall and the fourth partitioning wall are arranged at an equal distance from the slit, and the first partitioning wall, the second partitioning wall, the third partitioning wall and the fourth partitioning wall are evenly distributed in the chamber.

20. The power cable as claimed in claim 13, wherein the second end of the second arced wall bears against the second end of the third arced wall.

* * * * *